(12) United States Patent
Schumacher

(10) Patent No.: US 12,090,424 B2
(45) Date of Patent: Sep. 17, 2024

(54) FLUID FILTER FOR A MOTOR VEHICLE AND FILTER CARTRIDGE FOR SUCH A FLUID FILTER

(71) Applicant: Daimler Truck AG, Leinfelden-Echterdingen (DE)

(72) Inventor: Eric Schumacher, Stuttgart (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 439 days.

(21) Appl. No.: 17/627,363

(22) PCT Filed: Jul. 13, 2020

(86) PCT No.: PCT/EP2020/069706
§ 371 (c)(1),
(2) Date: Jan. 14, 2022

(87) PCT Pub. No.: WO2021/009098
PCT Pub. Date: Jan. 21, 2021

(65) Prior Publication Data
US 2022/0266172 A1    Aug. 25, 2022

(30) Foreign Application Priority Data
Jul. 15, 2019    (DE) .................... 10 2019 004 926.8

(51) Int. Cl.
*B01D 27/08*    (2006.01)
*B01D 27/02*    (2006.01)
(Continued)

(52) U.S. Cl.
CPC ............. *B01D 27/08* (2013.01); *B01D 27/02* (2013.01); *B01D 46/0002* (2013.01);
(Continued)

(58) Field of Classification Search
None
See application file for complete search history.

(56) References Cited

U.S. PATENT DOCUMENTS 3,272,336 A    9/1966    Humbert, Jr.
5,783,076 A    7/1998    Albers, Jr.
(Continued)

FOREIGN PATENT DOCUMENTS

DE            696 29 208 T2    4/2004
DE    10 2016 212 591 A1    1/2018
(Continued)

OTHER PUBLICATIONS

PCT/EP2020/069706, International Search Report dated Aug. 31, 2020 (Two (2) pages).
(Continued)

*Primary Examiner* — Krishnan S Menon
(74) *Attorney, Agent, or Firm* — Crowell & Moring LLP

(57) ABSTRACT

A fluid filter for a motor vehicle includes a filter housing and a filter cartridge which is fixable on the filter housing by rotating around a longitudinal axis of the filter cartridge. A holding element having a web is disposed on an end plate of the filter cartridge where the web protrudes from a wall of the holding element and where the wall is formed as a spiral shape. The web of the holding element is engageable behind a holding web of a counter bearing disposed on the filter housing that is spiral shaped. The holding web has an incline in a rotational direction in comparison to an abutment region of the filter housing on which a sealing element of the filter cartridge abuts.

10 Claims, 5 Drawing Sheets

(51) Int. Cl.
*B01D 46/00* (2022.01)
*B01D 46/24* (2006.01)
*B01D 46/52* (2006.01)

(52) U.S. Cl.
CPC ........ *B01D 46/2411* (2013.01); *B01D 46/521* (2013.01); *B01D 2201/347* (2013.01); *B01D 2201/4092* (2013.01); *B01D 2265/029* (2013.01); *B01D 2271/027* (2013.01)

(56) References Cited

U.S. PATENT DOCUMENTS

| 10,907,594 | B2* | 2/2021 | Thalmann | F01P 11/12 |
| 2010/0219116 | A1* | 9/2010 | Milum | B01D 29/21 |
| | | | | 210/232 |
| 2016/0339364 | A1* | 11/2016 | Thalmann | B01D 27/06 |
| 2019/0105586 | A1* | 4/2019 | Schumacher | B60H 3/0658 |

FOREIGN PATENT DOCUMENTS

| EP | 0 221 675 B1 | 5/1987 |
| EP | 2 201 993 A1 | 6/2010 |
| EP | 3 228 374 A1 | 10/2017 |
| IT | 201600097797 A1 | 3/2018 |
| WO | WO 2015/004106 A1 | 1/2015 |
| WO | WO 2015/091665 A1 | 6/2015 |
| WO | WO 2018/067437 A1 | 4/2018 |

OTHER PUBLICATIONS

U.S. Patent Application, "Fluid Filter for a Motor Vehicle and Filter Cartridge for a Fluid Filter", filed Jan. 14, 2022, Inventor Eric Schumacher.

* cited by examiner

FLUID FILTER FOR A MOTOR VEHICLE AND FILTER CARTRIDGE FOR SUCH A FLUID FILTER

BACKGROUND AND SUMMARY OF THE INVENTION

The invention relates to a fluid filter for a motor vehicle, having a filter cartridge which is fixed on a filter housing of the fluid filter. The filter cartridge has a receiving chamber in which a filter material is arranged. The filter cartridge can be connected to the filter housing by rotating around a longitudinal axis of the filter cartridge. Furthermore, the invention relates to a filter cartridge for such a fluid filter.

DE 696 29 208 T2 discloses a fuel filter arrangement having a support plate in the lower portion of the corresponding filter housing on which an annular filter element rests. A contaminant container is attached below the support plate. The support plate has a horizontal and planar spiral liquid passage, by means of which the filter housing is connected to the contaminant container. The annular filter element inserted into the fuel filter is centered and held on its upper end by a central tubular connection on the covering plate of the filter housing, the connection being encased by a seal.

DE 10 2016 212 591 A1 describes a liquid filter device in which an annular filter element arranged in the filter housing separates a pure side from a crude side. A bypass valve is provided on a lower end pane of the annular filter element. Flow guiding elements formed as spiral segments are attached on the end pane, for example, for deflecting the flow of the liquid. The annular filter element inserted into the filter housing is also held centrally in this construction by a central discharge pipe in the housing cover.

U.S. Pat. No. 3,272,336 shows an oil filter device, the annular filter insert of which has ribs formed as spiral segments on its upper end pane, by means of which ribs the inflowing crude oil is put into spiral motion in order to cause a centrifugally acting separation of heavier contaminative particles, which are led into a contaminant container at the bottom of the filter housing of the oil filter device.

EP 0 221 675 B1 describes a filter cartridge formed as an oil filter. The filter cartridge having a sealing device is attached to a filter bracket which is formed on a motor. For this, four inwardly projecting lugs are formed on an inside of a cylindrical wall of a housing of the filter cartridge. Four lugs are also provided on sides of the filter bracket, the lugs, however, projecting outwardly in comparison relative to a central axis of the filter cartridge. The inwardly projecting lugs are inserted between the outwardly projecting lugs to assemble the filter cartridge. The filter cartridge is then rotated a little further, such that the inwardly projecting lugs engage behind the outwardly projecting lugs.

Here, it can be considered as disadvantageous that the filter cartridge has to be positioned very precisely in relation to the filter bracket in order to be able to correctly fix the filter cartridge on the filter bracket.

Furthermore, it is disadvantageous that the lugs serving as locking elements can only confer holding forces across half the periphery of the housing of the filter cartridge. This is because it is necessary for assembly and disassembly that the four lugs provided on sides of the filter cartridge do not overlap with the four lugs provided on sides of the filter bracket.

Furthermore, EP 0 221 675 B1 describes the possibility of screwing a filter cartridge, which has a sealing ring on an end plate, onto a support of the filter bracket, wherein the support is provided with a screwing thread. Here, a passage opening is provided with a corresponding screwing thread in the end plate.

With such an attachment of the filter cartridge on the filter bracket, it is disadvantageous that several circumvolutions of the filter cartridge are necessary for the sealing ring to be pressed against the filter bracket. And also during disassembly, the unscrewing of the filter cartridge from the filter bracket is correspondingly laborious.

The object of the present invention is thus to create a fluid filter of the kind mentioned at the start in which a particularly simple assembly of the filter cartridge with reliable sealing effect is achieved, and to specify a filter cartridge that can be assembled correspondingly simply.

The fluid filter according to the invention for a motor vehicle comprises a filter cartridge, which is fixed on a filter housing of the fluid filter. The filter cartridge has a receiving chamber in which a filter material is arranged. The filter cartridge can be connected to the filter housing by rotating around a longitudinal axis of the filter cartridge. A holding element with a web is arranged on an end plate of the filter cartridge. The web protrudes from a wall of the holding element. The wall of the holding element is formed as a spiral radially to the longitudinal axis. In an assembly position of the filter cartridge, the web of the holding element engages behind a holding web of a counter bearing arranged on the filter housing and also formed as a spiral radially to the longitudinal axis.

Thus, a holding element formed as a spiral radially to the longitudinal axis is provided on sides of the filter cartridge and a counter bearing having a spiral shape radial to the longitudinal axis on sides of the filter housing. As a result of this construction, a particularly simple assembly of the filter cartridge is achieved. This is because the web of the holding element of the filter cartridge only needs to be positioned in relation to the holding web of the counter bearing in such a way that, as a result of rotating the filter cartridge in a rotational direction around the longitudinal axis, the web of the holding element engages behind the holding web of the counter bearing.

The assembly of the filter cartridge on the filter housing of the fluid filter can be achieved with a very slight rotational movement by rotating around the longitudinal axis of the filter cartridge. In contrast to screwing a filter cartridge onto a counterpiece, complete revolutions around the longitudinal axis no longer need to be undertaken on the part of the filter housing. Instead, a small rotational movement is sufficient for fixing the filter cartridge on the filter housing of the fluid filter. Thus, both the assembly and a disassembly of the filter cartridge can be undertaken particularly rapidly and with minimal effort.

In the rotational direction, the holding web of the counter bearing has an incline in relation to an abutment region of the filter housing, that is to say it runs along an incline. A sealing element of the filter cartridge rests on the abutment region when it is fixed on the filter housing of the fluid filter. As a result of the incline in relation to the abutment region, it is achieved that a tractive force acting in the direction of the longitudinal axis of the filter cartridge is exerted on the filter cartridge when fixing the filter cartridge on the filter housing with increasing rotation around the longitudinal axis. When rotating the filter cartridge in the rotational direction, this leads to a particularly tightly placed abutment of the sealing element of the filter cartridge on the abutment region of the filter housing. Due to the spiral shape, designed radially to the longitudinal axis, of the wall of the holding element, holding forces can be conferred across the entire length of the spiral. In the assembly position of the filter cartridge, these holding forces ensure the fixture of the filter cartridge on the filter housing of the fluid filter. Depending on the design of the holding element and available construction space, a length of the spiral-shaped holding element—in contrast to a bayonet closure, for example—can be greater than half the periphery of the filter housing or even greater than the periphery. Thus, a particularly secure and tightly placed fixture of the filter cartridge on the filter housing can be achieved.

Furthermore, due to the calibration of the spiral shape of the holding element and the spiral shape of the counter bearing provided on the part of the filter housing in relation to each other, it can be ensured that the exchange part in the form of the filter cartridge in the assembly position constantly has a predetermined exact alignment in relation to the filter housing. An operating person undertaking the assembly of the filter cartridge on the filter housing can thus very easily optically establish whether the filter cartridge in the assembly position is brought into the desired end position. In particular, it can thus be ensured that information attached to the filter cartridge, for example a component number, an item code number or similar, is constantly in the field of vision of the operating person or such a member of service staff when the filter cartridge is brought into its assembly position. This also facilitates replacing the used filter cartridge with a new or not yet used filter cartridge.

Due to the shaping of the holding element, which has the wall designed to be radially spiral-shaped and the web projecting from the wall in the manner of a flange, the holding element is formed to be hooked in cross-section. Accordingly, a tensioning geometry and holding geometry is provided by the holding element in relation to the abutment region for the seal. In particular, the web of the holding element serving as tensioning geometry or holding geometry is presently renewed together with the filter cartridge when replacing the filter cartridge. Thus, it can be taken into account that the holding element of the filter cartridge can be subject to attrition during assembly and when the filter cartridge is in operation.

Depending on the intended use and design of the fluid filter, different fluids can be filtered by means of the filter material arranged in the receiving chamber of the filter cartridge. Thus, the fluid filter can be formed as an air filter of an air conditioning system or ventilation system of the motor vehicle, by means of which ambient air can be filtered before it enters the passenger chamber of the motor vehicle. However, the fluid filter can also be formed as an air filter of an internal combustion engine of the motor vehicle or as a filter for filtering fuel. Furthermore, it is possible that the fluid filter is formed as an oil filter or as a water separator for separating water from a lubricant and/or a fuel. Moreover, it is possible that the fluid filter is formed as an air dyer by means of which the moisture in a system containing air, in particular pressurised air, of the motor vehicle, for example the pressurised air in a braking system, can be reduced.

Preferably, with the incline, when seen in the direction of the longitudinal axis of the filter cartridge, a distance of the holding web from the abutment region of the filter housing increases in the rotational direction. A reverse course of the incline is, however, also possible.

It is beneficial for the simple assembly of the filter cartridge on the filter housing of the fluid filter if the holding web having the incline is formed to be continuous in a rotational direction around the longitudinal axis, i.e., does not have any interruptions or apertures in the rotational direction.

The spiral-shaped counter bearing can revolve at least regionally around a tubular support of the filter housing. Here, the support is introduced into an opening which is formed in the end plate of the filter cartridge. By introducing the tubular support into the opening, it can be ensured that the filter cartridge is positioned before bringing it into the assembly position in such a way that the filter cartridge can be reliably brought into its assembly position by rotating the filter cartridge around the longitudinal axis. In particular, the introduction of the tubular support of the filter housing into the opening which is formed in the end plate of the filter cartridge thus serves to pre-position the filter cartridge on the filter housing during assembly of the filter cartridge on the filter housing.

The tubular support of the filter housing can have a recess on which a sealing element, in particular formed as an O-ring, of the filter cartridge can rest when the filter cartridge is fixed in its assembly position on the filter housing.

The filter cartridge according to the invention for a fluid filter of a motor vehicle can be fixed on a filter housing of the fluid filter. The filter cartridge has a receiving chamber on which a filter material is arranged. By rotating around a longitudinal axis of the filter cartridge, the filter cartridge can be connected to the filter housing. A holding element with a web is arranged on an end plate of the filter cartridge, the web projecting from a wall of the holding element. The wall of the holding element is formed as a spiral radially to the longitudinal axis. The web of the holding element is formed to engage behind the web of a counter bearing arranged on the filter housing and spiral-shaped radially to the longitudinal axis in an assembly position of the filter cartridge. By the web of the holding element of the filter cartridge engaging behind the holding web of the counter bearing, the fixing of the filter cartridge on the filter housing of the fluid filter can be achieved. Here, however, the filter cartridge only needs to be rotated a little further around the longitudinal axis. Consequently, the filter cartridge can be assembled particularly easily on the filter housing of the fluid filter. In addition, the disassembly of the filter cartridge from the filter housing of the fluid filter can also be effectuated rapidly and with minimal effort.

The filter cartridge can be rotated around the longitudinal axis in this rotational direction for fixing the filter cartridge on the filter housing.

The web of the holding element, more precisely a distance of the web from a surface of the end plate facing away from the filter material, has an incline in a rotational direction in which the filter cartridge can be rotated around the longitudinal axis for fixing on the filter housing. Due to this incline, an axial movement of the filter cartridge towards the filter housing is caused together with the rotation of the filter cartridge around the longitudinal axis in the rotational direction. Thus, it can be achieved that a sealing element of the filter cartridge is pressed against an abutment region which is formed on the part of the filter housing. Nevertheless, no laborious screwing in of the filter cartridge with several complete revolutions is required to bring the filter cartridge into the assembly position. Instead, a small movement in the rotational direction is sufficient for a tightly fitting fixture of the filter cartridge on the filter housing.

Preferably, a distance of the web of the holding element from a surface of the end plate facing away from the filter material increases in a rotational direction. A reverse design is also possible.

Advantageously, the filter cartridge can be brought into the assembly position by less than one complete revolution around the longitudinal axis. This is conducive to a very simple assembly of the filter cartridge on the filter housing with little effort.

In particular, it can be provided that free ends of the web of the holding element and free ends of the holding web are locked flush with one another in the assembly position. In this way, it can be achieved that, even when using a comparatively small amount of material for the holding element and the holding web, holding forces can be transferred to a great extent to the holding web by means of the holding element.

It can be provided that a curvature radius of the holding element increases from a center of a spiral shape of the wall of the holding element towards an edge of the spiral shape. Thus, when fixing the filter cartridge on the filter housing of the fluid filter, the filter cartridge can initially be rotated particularly easily around the longitudinal axis. With increasing rotation around the longitudinal axis and thus increasingly bringing the filter cartridge into the assembly position, the web of the holding element of the filter cartridge then engages increasingly further behind the holding web of the counter bearing. This makes it possible for an operating person who is undertaking the assembly of the filter cartridge, i.e., for example a fitter or a mechanic, to very easily establish when the filter cartridge has reached the assembly position. Nevertheless, the filter cartridge can be rotated very easily in the rotational direction at the start of the rotation around the longitudinal axis. And in the assembly position of the filter cartridge, a very resilient fixing of the filter cartridge on the filter housing can be achieved or is achieved.

Preferably, a sealing element is arranged on a front-end edge of a housing of the filter cartridge, the sealing element being able to be pressed against an abutment region of the filter housing by fixing the filter cartridge on the filter housing. Thus, when replacing the filter cartridge, the sealing element, which can be subject to wear, is also replaced.

Preferably, the receiving chamber is formed in a housing of the filter cartridge and is delimited on one side by the end plate of the filter cartridge. Thus, a very simple construction of the filter cartridge can be achieved.

In particular, the housing of the filter cartridge can be formed in the shape of a pot, wherein the end plate is then opposite a base of the pot-shaped housing. This is also advantageous in terms of a simple construction of the filter cartridge.

Furthermore, the end plate can have a plurality of through openings. A fluid to be filtered can reach the receiving chamber through such through openings and/or a filtered fluid can leave the receiving chamber. By providing several through openings in the end plate, a particularly even through-flow of the filter material with the fluid can be achieved.

The holding element can have a plurality of apertures in the peripheral direction of the filter cartridge. In other words, the holding element having the spiral shape does not need to be formed as a continuous spiral. Instead, individual sections of the spiral-shaped wall of the holding element can form the spiral shape. Accordingly, the web protruding from the wall is then also not formed continuously. Instead, each section of the wall has a web section, protruding from this section, of the holding element. Such an interrupted or segmented spiral shape of the holding element is advantageous in terms of a low weight of the filter cartridge.

The advantages described for the fluid filter according to the invention and preferred embodiments also apply to the filter cartridge according to the invention and vice versa.

Further advantages, features and details of the invention emerge from the below description of preferred exemplary embodiments and by means of the drawings. The features and feature combinations mentioned above in the description and the features and feature combinations mentioned below in the description of the figures and/or shown only in the figures can be used not only in the respectively specified combination but also in other combinations or on their own without leaving the scope of the invention.

DETAILED DESCRIPTION OF THE DRAWINGS

Figure 1:
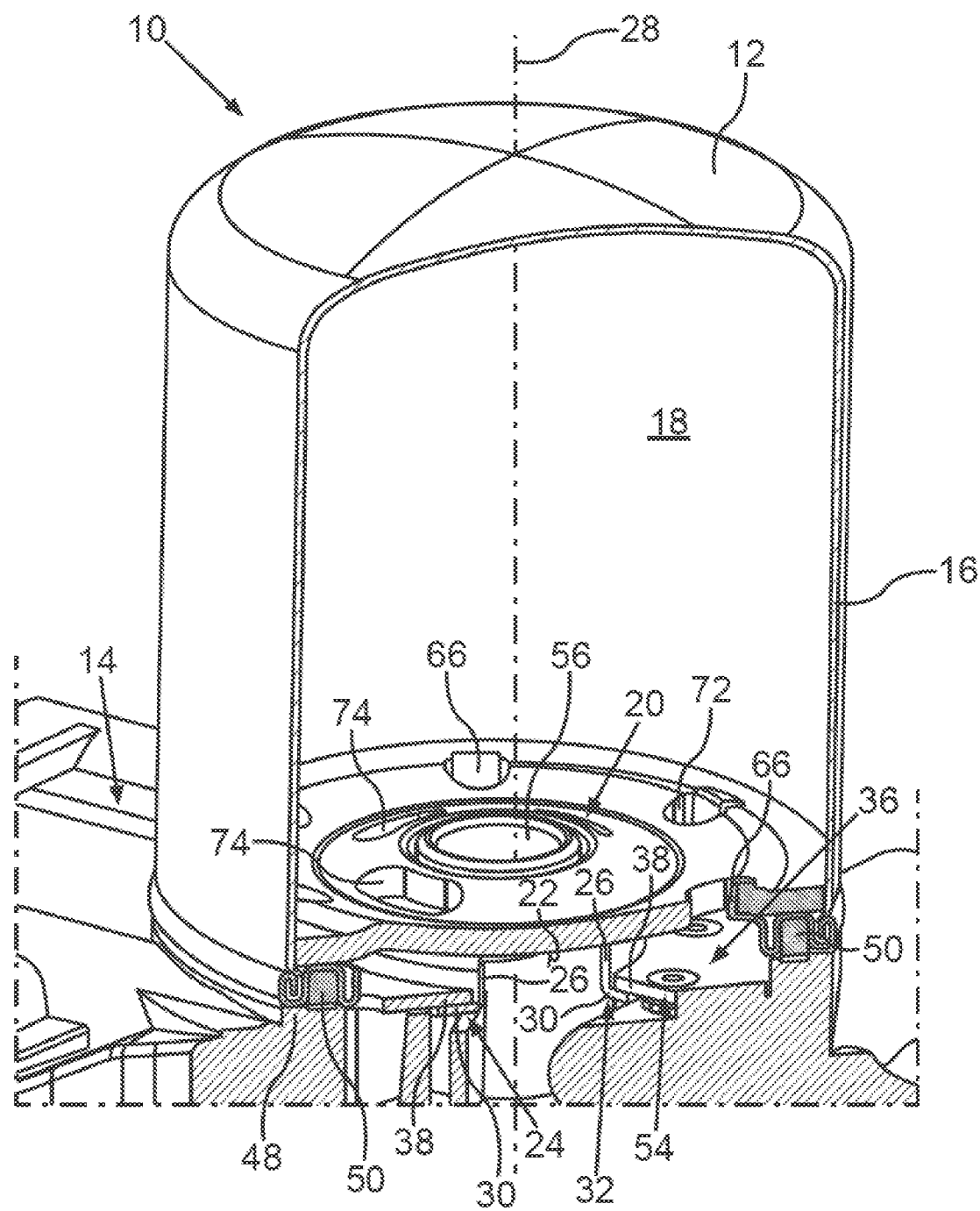
FIG. 1, in a partially cut-out depiction, shows a fluid filter of a motor vehicle formed as an air dyer.

The same or functionally identical elements are provided with the same reference numerals in each case in the figures.

A fluid filter 10 of a motor vehicle is shown in a cut-out and in sections in FIG. 1, wherein the fluid filter 10 is formed as an air dryer, for example. Correspondingly, a filter cartridge 12, which is fixed on a filter housing 14 of the fluid filter 10, is formed as a replaceable air dryer cartridge. A receiving chamber 18 is partially delimited by a presently pot-shaped housing 16 of the filter cartridge 12, in which receiving chamber a filter material (not shown) of the filter cartridge 12 is arranged. The filter material can be, for example, a granulate or similar. In contrast, when the fluid filter 10 is formed as an oil filter or as an air filter, for example, for an air conditioning system or an internal combustion engine of the motor vehicle, then the filter material can be provided by a pleated filter or similar.

Towards one side, presently towards the underside of the filter cartridge 12 facing towards the filter housing 14, the receiving chamber 18 is delimited by an end plate 20 of the filter cartridge 12. A holding element 24 is arranged on a surface, facing towards the filter housing 12, of the end plate 20, so presently on a surface 22 of the underside of the end plate 20, the shape of which holding element can be seen more clearly in FIG. 2.

Accordingly, the holding element 24 or such an assembly element, which provides for the holding of the filter cartridge 12 on the filter housing 14 of the fluid filter in the assembly position, shown in FIG. 1, of the filter cartridge 12, is formed to be spiral shaped. In doing so, a wall 26 of the holding element 24, which extends in the direction of a longitudinal axis 28 (c.f. FIG. 1) of the filter cartridge 12, has a spiral shape radially to the longitudinal axis 28.

Figure 2:
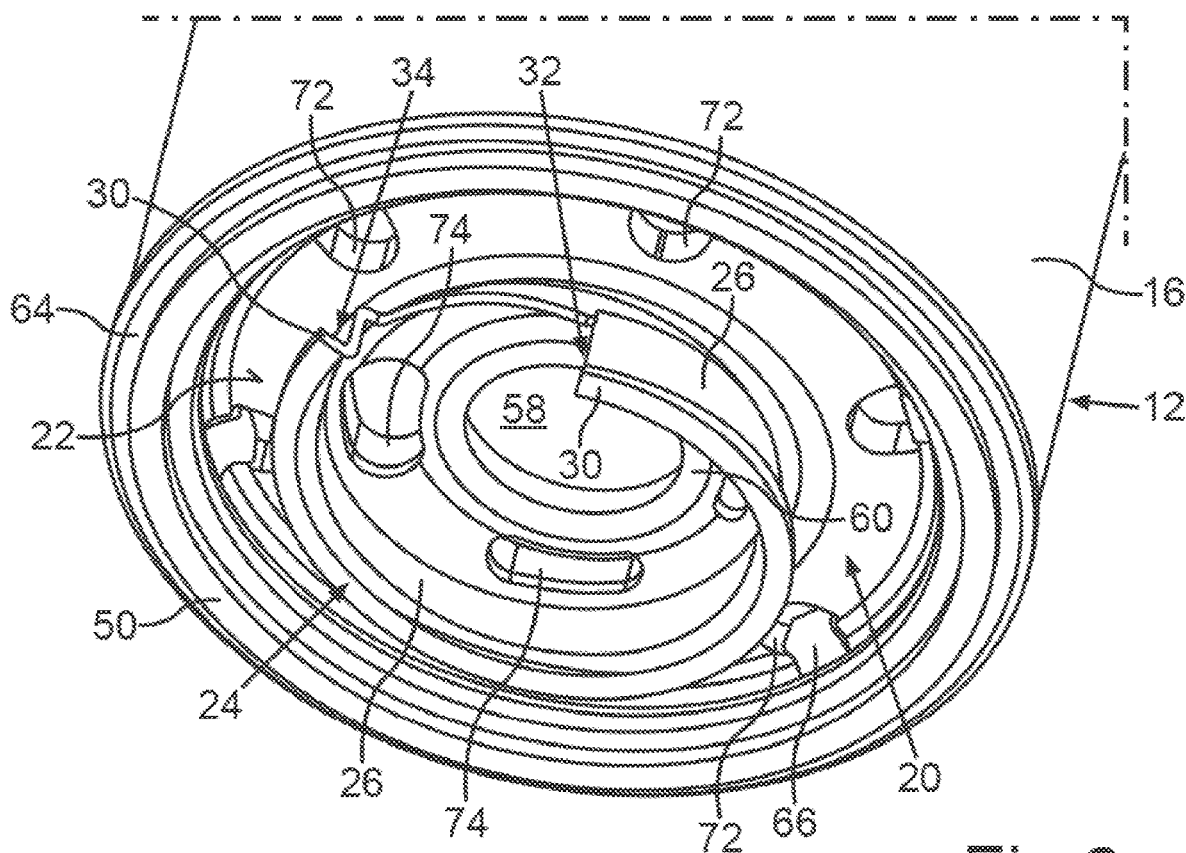
FIG. 2, in perspective and in sections, shows a filter cartridge of the fluid filter.

A flange or web 30 protrudes outwardly in the radial direction from the wall 26 of the holding element 24. In FIG. 1, the wall 26 and the web 30 can be seen once in a sectional view and once in a perspective view of a free end 32 of the holding element 24. This first free end 32 is spaced apart from a further free end 34 of the holding element 24 (c.f. FIG. 2) in the peripheral direction of the presently cylindrical housing 16 of the filter cartridge 12.

Figure 3:
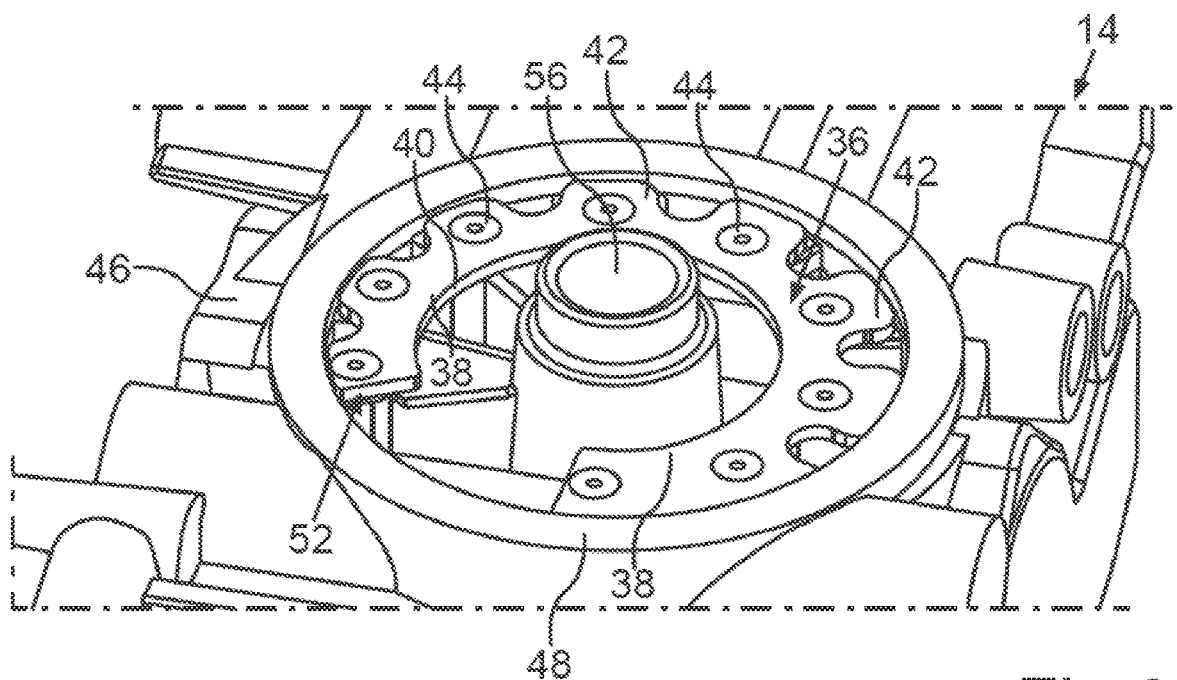
FIG. 3, in perspective and in sections, shows a filter housing of the fluid filter, on which the filter cartridge can be placed.

It is obvious in particular when looking at FIG. 1 together with FIG. 3 that a counter bearing 36 for the holding element 24 is provided on the part of the filter housing 14 of the fluid filter 10. The counter bearing 36 is also formed to be spiral shaped radially to the longitudinal axis 28 of the filter cartridge 12. The counter bearing 36 comprises a holding web 38. A front end side 40 of the holding web 38 here delineates the spiral shape of the counter bearing 36. When the filter cartridge 12 is fixed on the filter housing 14, i.e., is in its assembly position shown in FIG. 1, the web 30 of the holding element 24 engages behind the holding web 38 of the counter bearing 36.

Presently, the counter bearing 36 has a plurality of extensions 42 c.f. FIG. 3), of which, for reasons of clarity, only some are provided with a reference numeral. In the region of these extensions 42, the counter bearing 36 is placed on a base body 46 of the filter housing 14 by means of a plurality of screwing bolts 44 or similar fixing elements. An abutment region 48 presently formed annularly and running horizontally is also provided by the base body 46 of the filter housing 14, against which abutment region a presently annular sealing element 50 (c.f. FIG. 2) of the filter cartridge 12 is pressed (c.f. FIG. 1) when the filter cartridge 12 is in its assembly position.

An incline—or an inclined course—of the holding web 38 provides for an axial tractive force, i.e., a tractive force acting in the direction of the longitudinal axis 28 of the filter cartridge, and such an incline—or an inclined course—of the holding web 38. It is obvious from FIG. 1, yet in particular from FIG. 3, that a distance of the holding web 38 from the abutment region 48 increases when seen in the direction of the longitudinal axis 28 due to the incline of the holding web 38. Accordingly, in the region of a first free end 52 of the counter bearing 36, the distance of the holding web 38 from the abutment region 48 in the direction of the longitudinal axis 28 is smaller than in the region of a second free end 54 of the counter bearing 36.

Figure 5:
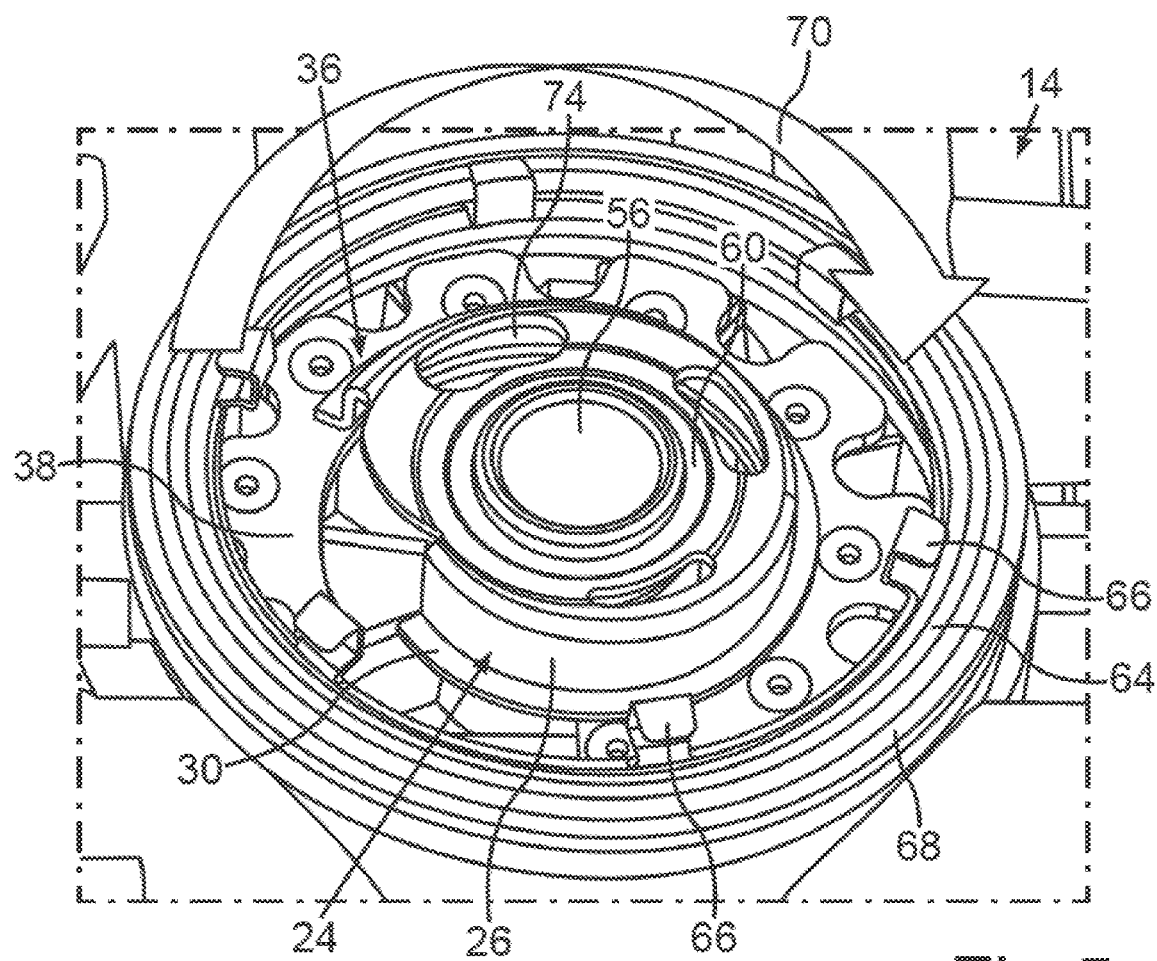
FIG. 5 shows components of the filter cartridge according to FIG. 2, which comprise a spiral holding element of the filter cartridge, wherein the holding element is shown in an alignment in relation to a spiral-shaped counter bearing arranged on the filter housing, as it is present before placing the filter cartridge on the filter housing.

In contrast, a distance of the web 30 of the holding element 24 from the surface 22 of the underside of the end plate 20 in the region of the first free end 32 of the holding element 24 is greater than in the region of the second free end 34 of the holding element 24. The distance of the web 30 of the holding element 24 from a surface, facing away from the filter material, of the end plate 20 thus increases in a rotational direction 70 (c.f. FIG. 5) in which the filter cartridge 12 is rotated around the longitudinal axis 28 for the purpose of fixing the filter cartridge 12 on the filter housing 14. The assembly element formed to be hooked in cross-section or holding element 24, which comprises the wall 26 and the web 30 protruding outwardly from the wall 26, thus provides, on the one hand, a holding geometry and, on the other hand, a tensioning geometry.

As presently shown by way of example, the holding element 24 can be formed continuously in the peripheral direction of the housing 16. In variants of the fluid filter 10, this holding element 24 can, however, also be formed to be segmented, i.e., have a plurality of apertures (not shown presently). Accordingly, not only the first free end 32 is then spaced apart from the opposite free end 34 of the holding element 24. Instead, on a stretch from the first free end 32 towards the second free end 34 of the holding element 24, further apertures are then present in which at least the web 30 or also the web 30 and the wall 26 are not present. However, the sections of the wall 26 further also then delineate the spiral shape, such that the wall 26 having apertures of the holding element 24 is formed to be spiral shaped.

Figure 4:
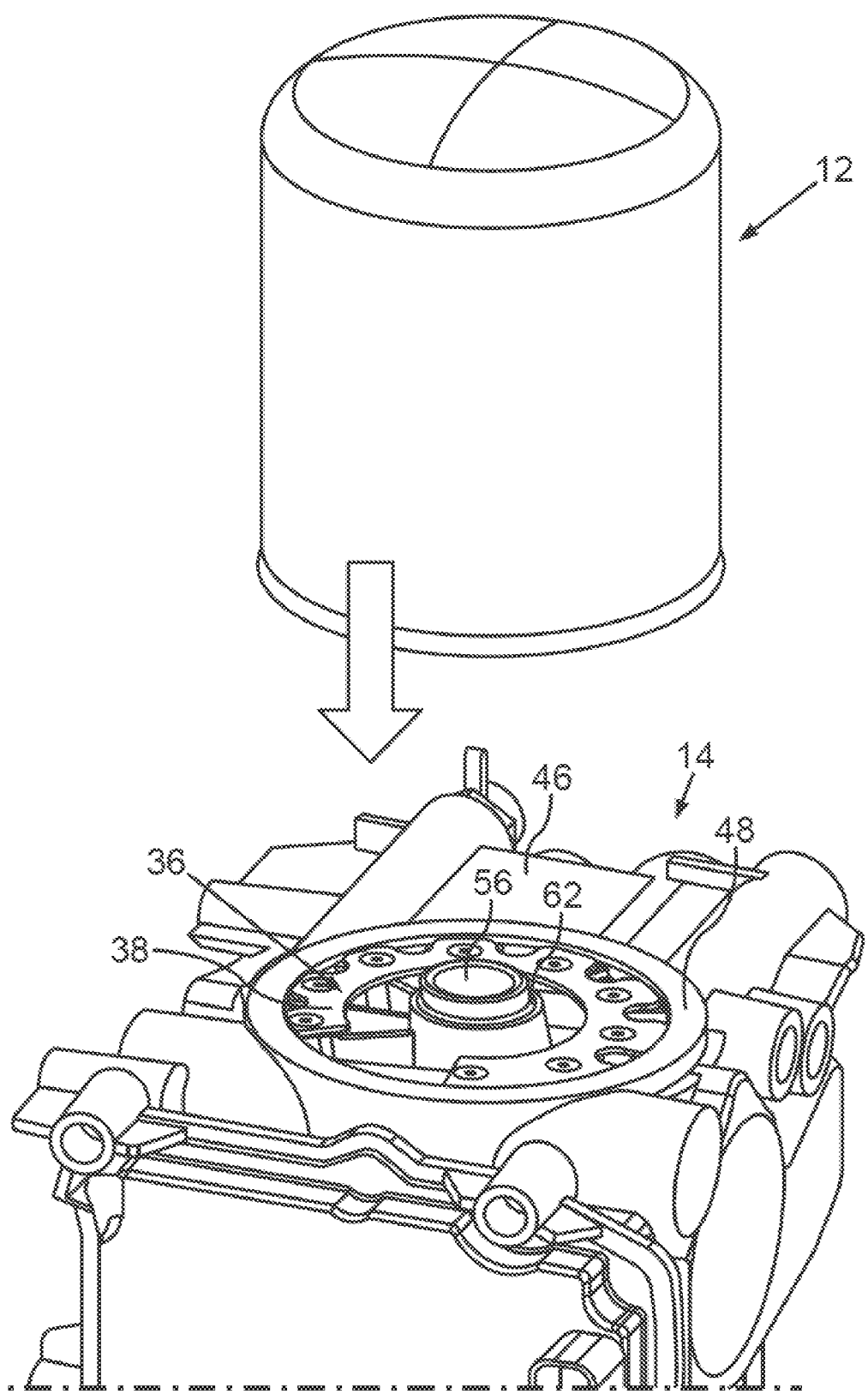
FIG. 4 shows a first step during assembly of the filter cartridge on the filter housing.
Figure 8:
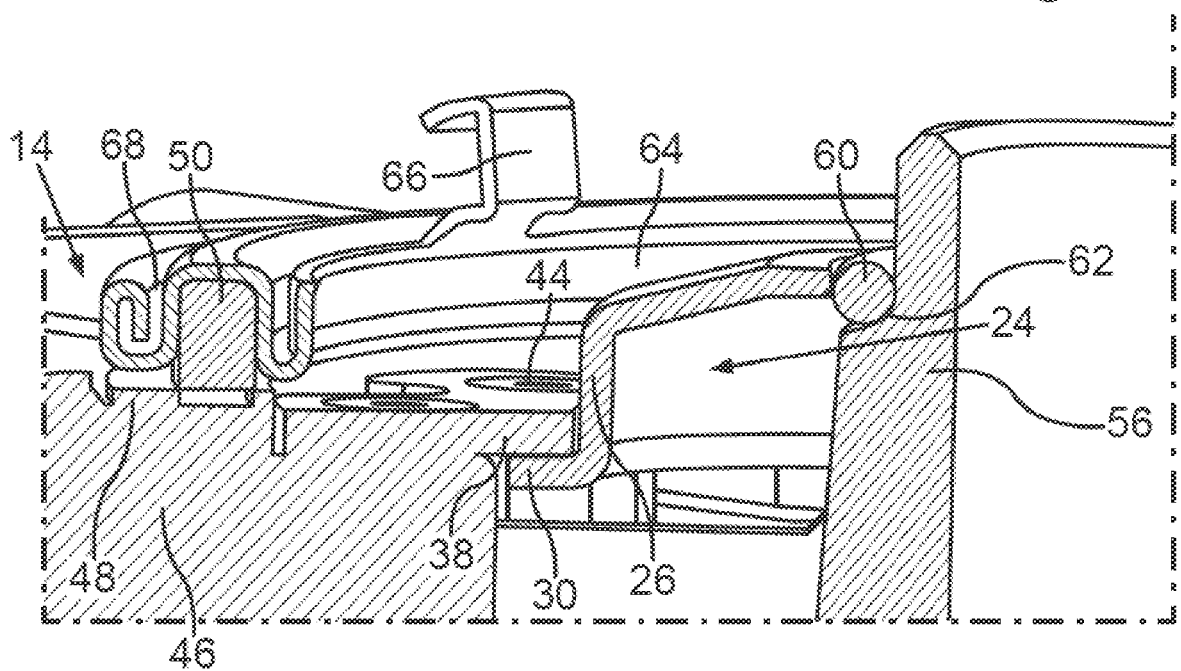
FIG. 8, in a partially cut-out depiction, shows the components, shown in FIG. 7, of the fluid filter.

The assembly of the filter cartridge 12 on the filter housing 14 of the fluid filter 10 is to be explained with reference firstly to FIG. 4. Accordingly, the filter cartridge 12 is placed onto the filter housing 14 in the direction of its longitudinal axis 28 (c.f. FIG. 1). In doing so, a tubular support 56 of the filter housing 14 is introduced into an opening 58, which is formed in the end plate 20 of the filter housing 12 (c.f. FIG. 2). A sealing element (c.f. FIG. 2) presently formed as a sealing ring 60 or O-ring runs around the opening 58. When the filter cartridge 12 is fixed on the filter housing 14, then this sealing ring 60 rests on a stepped extension 62, which is formed on the tubular support 56 (c.f. FIG. 8).

Figure 6:
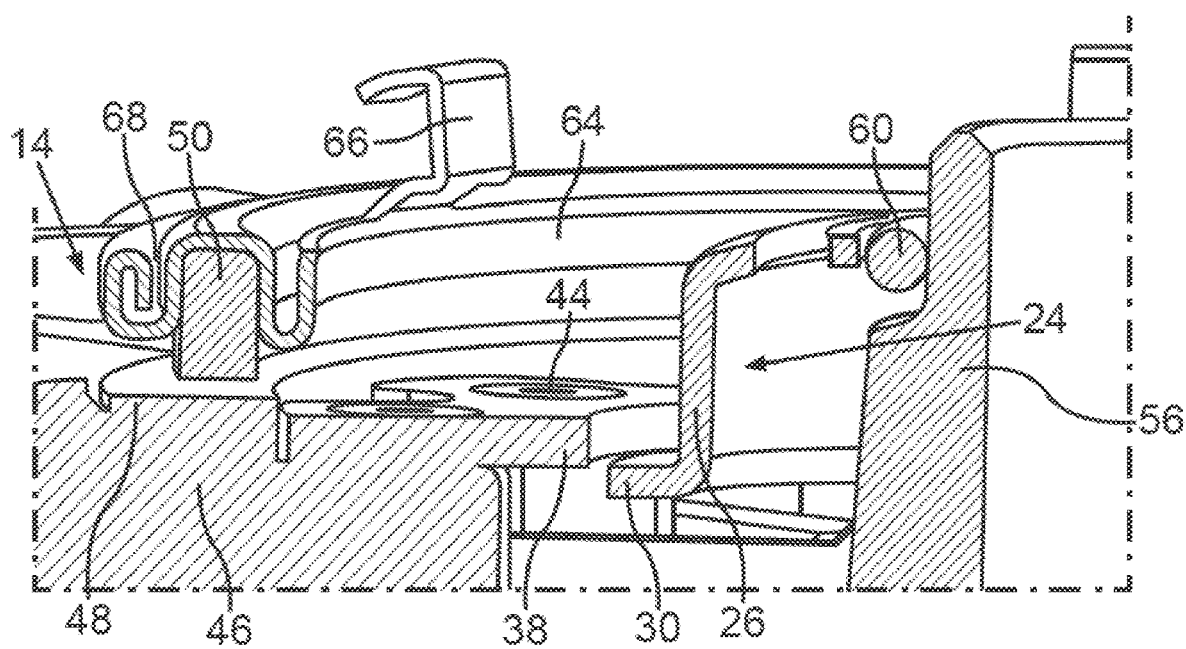
FIG. 6, in a partially cut-out depiction, shows the components, shown in FIG. 5, of the fluid filter, wherein a seal of the filter cartridge is not yet pressed against an abutment region provided on the part of the filter housing.

In FIG. 5, only the holding element 24 and an annular holding profile 64 of the filter cartridge 12 are shown, the holding profile serving to hold the presently annular sealing element 50 of the filter cartridge 12 (c.f. FIG. 2 and FIG. 6). The holding profile 64 presently has a plurality of fixing lugs 66, by means of which the holding profile 64 is held on the end plate 20 (c.f. FIG. 1). Furthermore, the holding profile 64 has a pleated region 68 in which a front-face end of a side wall of the housing 16 of the filter cartridge 12 is introduced (c.f. FIG. 1). In this way, the housing 16 is presently connected to the holding profile 64.

The end plate 20 is not depicted in FIG. 5 for the sake of clarity. According to FIG. 5, the filter cartridge 12 is placed onto the filter housing 14 for the purposes of assembly in such a way that the annular support 56 enters the opening 58 which is formed in the end plate 20 of the filter cartridge 12. In particular when looking at FIG. 5 together with FIG. 6, it can be seen that the web 30 of the holding element 24 still does not engage behind the holding web 39 of the counter bearing 36 when pre-positioning the filter cartridge 12 on the filter housing 14. In this respect, it is obvious from FIG. 6 that, when pre-positioning the filter cartridge 12 on the filter housing 14, the sealing element 50 is also still not pressed against the abutment region 48 of the filter housing 14.

Then, rotating the filter cartridge 12 around its longitudinal axis 28 in the rotational direction 70, which is illustrated in FIG. 5 by an arrow, when bringing the filter cartridge 12 into its assembly position causes the holding element 24 to be hooked on the counter bearing 36. Here, the web 30 engages behind the holding web 38.

Figure 7:
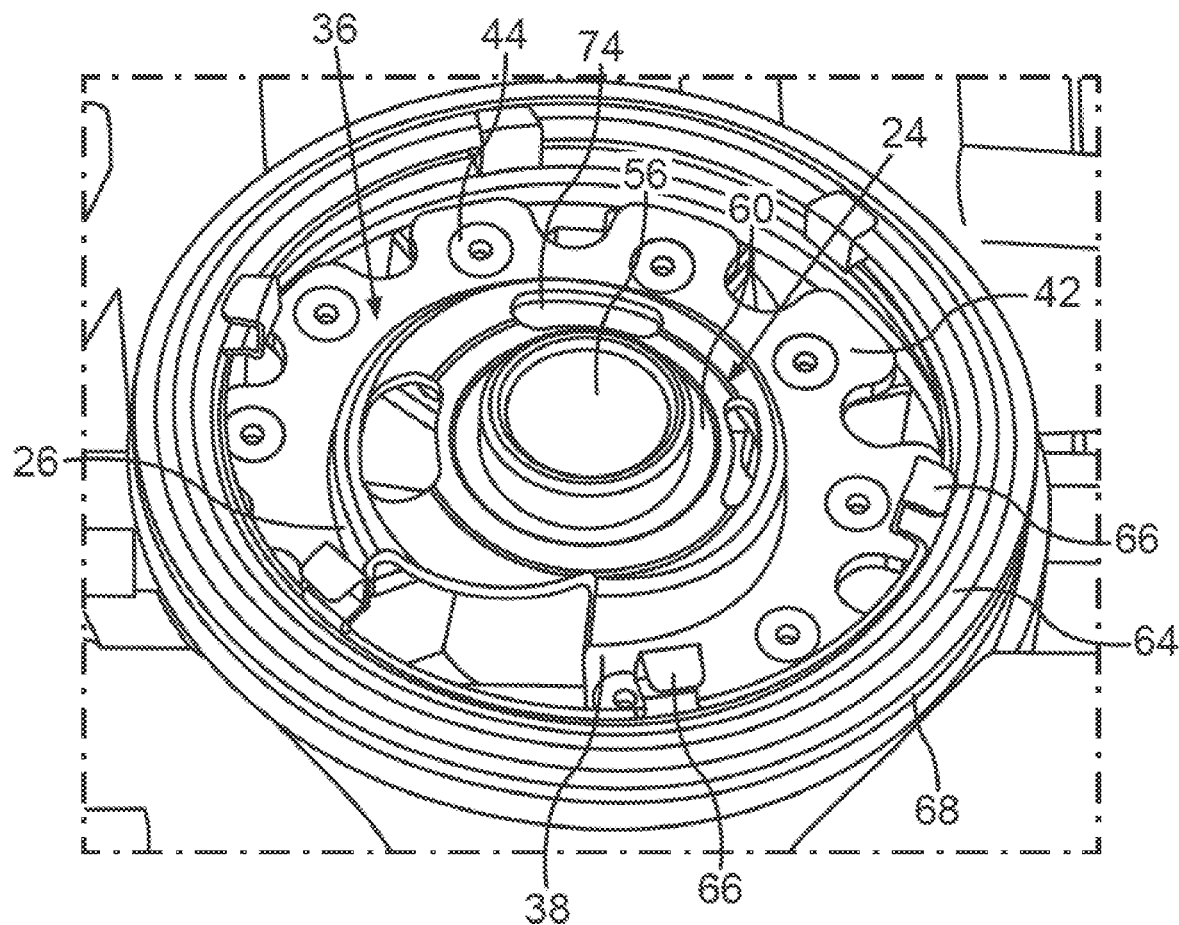
FIG. 7 shows the components of the filter cartridge according to FIG. 5, wherein the filter cartridge is brought into its assembly position in which a web of the spiral-shaped holding element of the filter cartridge engages behind a holding web of the spiral counter bearing.

In FIG. 7, only the holding element 24, the holding profile 64 and the sealing ring 60 are also shown of the filter cartridge 12 brought into its assembly position or end position. However, according to FIG. 7, the filter cartridge 12 and, with this, the holding element 24, is rotated a little further in the rotational direction 70. As a result, the filter cartridge 12 is hooked to the filter housing 14 via the holding element 24.

Due to the incline of the counter bearing 36 and the incline of the holding element 24 corresponding to this incline, when rotating the filter cartridge 12 in the rotational direction 70, a tractive force in the direction of the longitudinal axis 28, i.e., an axial tractive force, acts on the filter housing 14. This leads to the sealing ring 50 being pressed against the abutment region 48 of the filter housing 14 in the assembly position of the filter cartridge 12 (c.f. FIG. 8). Furthermore, it is obvious from FIG. 8 as to how the web 30 of the holding element 24, which protrudes from the spiral-shaped wall 26, also engages behind the spiral-shaped holding web 38 of the counter bearing 36.

To replace the filter cartridge 12 or when installing a new filter cartridge 12, the exchange part in the form of the filter cartridge 12 is firstly placed on the filter housing 14. Then, the filter cartridge 12 is rotated around the longitudinal axis 28. Thus, the filter cartridge 12 is connected in the manner of an undercut to the filter housing 14 and set up. Due to the inclines f the counter bearing 36 and the holding element 24, an axial movement of the filter cartridge 12 is also carried out at the same time as the rotational movement. This axial movement ensures the pressing of the seal or the sealing element 50 of the exchange part onto the sealing surface, which is provide by the abutment region 48 of the filter housing 14 or a corresponding module of the fluid filter 10.

It can be seen from FIG. 2 and FIG. 1 that, on the one hand, through openings 72 are formed in the end plate 20, with which the fixing lugs 66 engage. Presently, filtered fluid leaves the receiving chamber 18 via these through openings 72, yet also via further through openings 74 formed in the end plate 20, which are additionally also formed in the holding element 24 (c.f. FIG. 5 and FIG. 7). In contrast, the fluid to be filtered can be introduced into the receiving chamber 18 via the tubular support 56. Similarly, it is possible to introduce the fluid to be filtered into the receiving chamber 18 via the through openings 72, 74. Then, the filtered fluid can leave the receiving chamber 18 via the tubular support 56. The through openings 74 in the end plate 20 presently align with the through openings 74 which are formed in the holding element 24 (c.f. FIG. 2).

In the presently pot-shaped housing 16 of the filter cartridge 12, the receiving chamber 18 is, on the one hand, delimited by the jacketing wall which is fixed on the holding profile 64 of the filter cartridge 12 by plugging into the pleated region 68. On the other hand, the receiving chamber 18 is presently delimited by the end plate 20 which lies opposite a floor-side wall of the pot-shaped housing 16.

The invention claimed is:

1. A fluid filter for a motor vehicle, comprising:
   a filter housing; and
   a filter cartridge which is fixable on the filter housing, wherein the filter cartridge has a receiving chamber in which a filter material is disposed and wherein the filter cartridge is fixable on the filter housing by rotating around a longitudinal axis of the filter cartridge;
   wherein a holding element having a web is disposed on an end plate of the filter cartridge, wherein the web protrudes from a wall of the holding element, and wherein the wall is formed as a spiral shape when seen radially to the longitudinal axis;
   wherein the web of the holding element is engageable behind a holding web of a counter bearing disposed on the filter housing that is spiral shaped when seen radially to the longitudinal axis;
   wherein the holding web has an incline in a rotational direction when seen in a direction of the longitudinal axis in comparison to an abutment region of the filter housing on which a sealing element of the filter cartridge abuts.

2. The fluid filter according to claim 1, wherein a distance of the holding web from the abutment region of the filter housing increases in the rotational direction with the incline of the holding web formed continuously around the longitudinal axis.

3. The fluid filter according to claim 1, wherein the spiral shaped counter bearing runs around a tubular support of the filter housing at least regionally and wherein the tubular support is introducible into an opening formed in the end plate of the filter housing.

4. A filter cartridge for a fluid filter of a motor vehicle which is fixable on a filter housing of the fluid filter, comprising:
   a receiving chamber in which a filter material is disposed and wherein the filter cartridge is fixable on the filter housing by rotating around a longitudinal axis of the filter cartridge; and
   a holding element having a web is disposed on an end plate of the filter cartridge, wherein the web protrudes from a wall of the holding element and wherein the wall is formed as a spiral shape when seen radially to the longitudinal axis;
   wherein the web of the holding element is engageable behind a holding web of a counter bearing disposed on the filter housing that is spiral shaped when seen radially to the longitudinal axis;
   wherein a distance of the web of the holding element from a surface of the end plate facing away from the filter material in a rotational direction, in which the filter cartridge is rotatable around the longitudinal axis for fixing the filter cartridge on the filter housing, has an incline.

5. The filter cartridge according to claim 4, wherein, with the incline, the distance of the web in relation to the surface facing away increases in the rotational direction.

6. The filter cartridge according to claim 4, wherein the filter cartridge is positionable into an assembly position by less than one complete revolution around the longitudinal axis wherein in the assembly position free ends of the web of the holding element and free ends of the holding web seal flush with one another.

7. The filter cartridge according to claim 4, wherein a curvature radius of the holding element increases from a center of a spiral shape of the wall of the holding element towards an edge of the spiral shape.

8. The filter cartridge according to claim 4, wherein a sealing element is disposed on a front-end edge of a housing of the filter cartridge and wherein the sealing element is pressable against an abutment region of the filter housing by fixing the filter cartridge on the filter housing.

9. The filter cartridge according to claim 4, wherein the receiving chamber is formed in a pot-shaped housing of the filter cartridge and is delimited towards a side by the end plate of the filter cartridge.

10. The filter cartridge according to claim 4, wherein the holding element has a plurality of apertures in a peripheral direction of the filter cartridge.

* * * * *